United States Patent Office 2,889,662
Patented June 9, 1959

2,889,662

PRODUCTION OF HYBRID COTTONSEED BY CHEMICALLY INDUCING MALE-STERILITY

Frank M. Eaton, Riverside, Calif., and Dougal Harold McRae, Levittown, Pa., assignors to Rohm & Haas Company, Philadelphia, Pa., a corporation of Delaware No Drawing. Application May 10, 1957
Serial No. 658,253

12 Claims. (Cl. 47—5)

This invention relates to the production of hybrid cottonseed. It is based on the discovery that certain chlorinated aliphatic acids and their water-soluble salts adversely affect the production of fertile pollen in the cotton flower without apparent, detrimental effect upon the ovules.

It has been known that significant improvement in plant characteristics and yield of cotton can be obtained from cottonseed produced under conditions conductive to a high percentage of cross-pollination. Cotton geneticists have also long realized that, if male-sterility could be induced or imparted to cotton plants, improved hybrid cottonseed would be obtainable which would greatly improve the quality and quantity of cotton from the first generation plants. Heretofore, however, no means were available for inducing or producing male-sterility except by laborious hand-emasculation of the cotton flower.

It is also known that the chlorinated aliphatic acids and their salts of the kind found useful in the practice of this invention affect in one way or another the growth characteristics of many plants. Some of them have been proposed for use as herbicides or to otherwise control undesirable plant growth. They have not, however, heretofore been known to have selective action on gametophytes of different sexes.

The present invention is based upon the discovery that, when used on cotton in the manner hereinafter described, these chlorinated aliphatic acids and salts so affect the flowering of the plant that there are produced flowers otherwise normal but containing little or no pollen or containing a sterile or substantially sterile pollen. By so inducing male-sterility while preserving fertile ovules, plant specimens are obtained admirably suited to cross-pollination by natural means.

The compounds which may be used in the practice of this invention are those compounds which in water-solution form anions of a chlorinated aliphatic acid which contains from two to four carbon atoms and at least two chlorine atoms. Specifically, these acids are 2,3-dichloroisobutyric acid, trichloroacrylic acid, 2,3-dichloropropionic acid, 2,2,3-trichloropropionic acid, trichloroacetic acid, 2,2-dichloropropionic acid, 2,2,3-trichloro-n-butyric acid, and dichlorosuccinic acid. These acids may be used as the free acid or in the form of their salts, examples of which are the sodium, potassium, iron, aluminum, cadmium, calcium, nickel, mercury, copper, zinc, manganese, and barium salts, and the ammonium salts formed with ammonia, amines or quaternary ammonium groups, including monomethylamine, dimethylamine, trimethylamine, the ethylamines, ethanolamine, dimethylethanolamine, morpholine, pyrrolidine, or pyridine, or such quaternary groups as tetramethylammonium, benzyltrimethylammonium, dibenzyldimethylammonium, methylpyridinium, or methylmorpholinium, didodecenyldimethylammonium, N-dodecyl-N-benzyl-N,N-dimethylammonium, N-dodecylbenzyl-N,N,N-trimethylammonium, or octylphenoxyethylbenzyldimethylammonium.

In practicing the invention, the area in which the hybrid seed is to be produced is planted with at least two varieties of cotton plant. The varieties may be of the same species or may be varieties of different species. Thus, two varieties of American-Egyptian may be crossed or a variety of American-Upland may be crossed with an Egyptian cotton. Sea Island and Upland crosses appear to be of particular interest. The term "variety" as hereinafter used should be understood as meaning subspecies of a species and also, if there be a species without recognized subspecies, then the species itself as the sole variety of the species. The two or more varieties are planted in such manner that all plants of each variety are in close proximity with each other, preferably in alternate rows or in an arrangement of two rows of the variety to be rendered male-sterile alternating with one row of the second variety. Such arrangements allow for ready access to each variety with power-driven equipment but this invention does not depend on the particular arrangement and any other systematic mixed planting of the area may be practiced which on the one hand places the two varieties sufficiently close to each other to encourage cross-pollination yet sufficiently separated to allow for the spraying or dusting of one variety without harmful contamination of the other.

To effect male-sterility or substantial male-sterility in one of the varieties, that variety is treated with the chlorinated aliphatic acid or a salt thereof by spraying or dusting. The rate of application should be such as to substantially affect the male gametophytes but insufficient to cause substantial injury to the plant. This will depend to a large degree on other factors, such as the age of the plant and climatic conditions, and to some degree upon the particular species being treated, it having been observed that all species do not give equal response to apparently identical treatment. The optimum dosage will also vary with the particular compound being used as they are not all equally active and some are more phytotoxic to the cotton plant than others. A good practical rule is to apply the chlorinated aliphatic acid or salt at a rate at which slight injury to the plant occurs from which it will recover, or at a rate slightly below the point of injury. In the case of 2,3-dichloroisobutyric acid our experience has been that injury to the cotton plant begins to show at an application rate of about 8 pounds per acre. At double this rate the injury is significant, but the plants recover. A simple test on one or two plants will readily show whether the particular spray concentration and application rate cause severe injury. In the case of species more susceptible to injury or when application is made under circumstances conducive to plant injury, the dosage may be applied in two or more sprayings or dustings with only a portion of the total dosage in each application whereby the concentration of active principle in the plant system is built up in stages or is maintained at an effective level. Useful results are obtainable at considerably lower rates and, particularly when repeat spraying is practical, as little as one pound per acre will produce chemical-emasculation.

The chlorinated aliphatic acids or salts thereof should be applied as a water-solution or as dust. The concentration of active ingredient in the water is less important than the rate of application of active ingredient per acre of treated area and may vary over a wide range from 0.1% to 5%, with the lower concentrations being particularly useful when two or more applications are made. We prefer a concentration of from 0.5% to 2%. Wetting agents such as dodecylbenzene sodium sulfonate, sodium dodecyl sulfate, dodecyltrimethylammonium chloride, or an octylphenoxypolyethoxyethanol may be added if desired but such agents have a tendency to increase the phytotoxicity of the spray. For the preparation of suitable dusts, the active ingredient is combined with inert carriers such as finely particled clays, talc, pyrophyllite, diatomaceous earth, and magnesium carbonate with or without the addition of dispersing or wetting agents.

The timing of the application of the chlorinated aliphatic acids and their salts to the cotton plant does not appear to be critical. These chemicals are absorbed by and they or their derivatives are translocated within the plant and their effectiveness remains for several weeks after application. It has been observed that treating the soil before or after planting results in the chlorinated aliphatic acids and their salts being absorbed by the plant and producing physiological responses. Preferably, the chemicals are applied after the plants have become established and before the first flower buds have opened.

The following examples illustrate the practice of the invention.

*Example 1*

Greenhouse Empire cotton plants were sprayed once with a 1.2% solution of the sodium salt of 2,3-dichloroisobutyric acid and the growth of the plants observed over a five-week period. During this time the plants quadrupled in size and many new branches were produced that bore flowers. The flowers appeared normal except that they produced no viable pollen. Some of the flowers on the treated plants were hand-pollinated with pollen from plants that had not been treated with chlorinated aliphatic acid. The flowers thus pollinated produced normal bolls with viable seed. Those flowers that were not hand-pollinated produced young parthenocarpic bolls, which the plant shed.

*Example 2*

An experimental plot was planted with alternate rows of red-leaf and green-leaf cotton. These were selected for the test because it is known that, when flowers of green-leaf varieties are fertilized with red-leaf pollen, the resulting seeds produce seedlings having red hypocotyls and red cotyledons when exposed to bright light. Four varieties of green-leaf cotton were selected and each was planted in a row forty feet long between adjacent rows of red-leaf cotton. There were ten-foot row segments of red-leaf cotton on the ends of each row of green-leaf variety. When the plants were 15 to 20 inches tall, about one week in advance of the first flowers, the four green-leaf varieties were sprayed with a 1% aqueous solution of the sodium salt of 2,3-dichloroisobutyric acid at a rate which used one ounce of dry chemical per 100 feet of row. This is equivalent to an application rate of approximately eight pounds per acre. (In considering the dosage rate, only those plants actually sprayed are taken into account. Thus, since in this test only alternate rows were sprayed, an application rate of eight pounds per acre requires only four pounds of chemical per acre of planted area.) This dosage gave little evidence of plant injury and, as it rained after the first spraying, a second application of ½% solution using the same carrier volume was sprayed on the same plants the following day. Starting about two weeks after the first bolls had opened, the green-leaf cottons were picked three times at bi-weekly intervals. The seeds from these pickings were planted in greenhouse trays and the following percentages of seedlings having red hypocotyls were obtained:

| Variety | Picking | | |
|---|---|---|---|
| | 1st | 2nd | 3rd |
| Upland: | | | |
| Empire | 75 | 77 | 62 |
| Acala 4-42 | 33 | 40 | 33 |
| American-Egyptian: | | | |
| Amsak F₁s | 88 | 77 | 85 |
| Pima S-1 | 75 | 78 | 66 |

These data indicate that, except for the variety Acala 4-42, the treatment produced a high degree of male-sterility in the green-leaf cottons. The Acala 4-42, however, produced more green- than red-leaf seedlings, which indicates that this variety had not been rendered male-sterile. With the pollen from the green-leaf Acala available in the test planting, it would not be expected that the seedlings from the other varieties would all be red, but even with this consideration the tests establish a high degree of hybridization. Subsequent tests performed in the greenhouse have established that, by using a somewhat more phytotoxic treatment on the Acala variety, male-sterility is induced.

The fact that the Acala variety possesses a higher threshold value for induced male-sterility has the important advantage that this variety may be crossed with a variety having a lower threshold value by a modification of the process herein described wherein the varieties of different threshold value are planted in close proximity to each other and the entire field sprayed or dusted at a dosage level sufficiently high to induce male sterility in the variety of lower threshold value but below the level at which sterility would be induced in the Acala variety. In this modification it is unnecessary to avoid or minimize contact of the spray or dust with the variety intended as male parent.

Test data have also established that the physiological responses of cotton to the sodium salt of 2,3-dichloroisobutyric acid are characteristic of the responses induced by the free acid and by other salts and by the other chlorinated aliphatic acids and their salts heretofore mentioned. While some variation is to be expected among the different specific chemicals, even as such variation exists among the different varieties of cotton, these variables or their practical effect can be reduced considerably, if not eliminated, by following one of the rules heretofore mentioned of determining the dosage which will cause severe injury on a few plants in the area to be treated and applying a dosage sufficiently below this level to be safe either by reducing the total amount of chemical applied or by applying it in two or more sprayings of safe dosages each. When repeat applications are made, care must be observed to prevent a build-up of the chemical in the plant system to the point where serious toxic effects are produced. It is also within the purview of this invention to use different specific chlorinated aliphatic acids or their salts in the different sprays when a plurality of sprays are to be applied as is also the use of a mixture of these chemicals in a single spray.

Since, by the proper use of the chlorinated aliphatic acids and their salts, male-sterility can be induced in the cotton plant, it is now possible to hybridize two varieties or species of cotton by treating the one type in the manner herein described and cross-pollinating from the untreated second type. The cross-pollination may be accomplished by hand but preferably by natural means through pollen-transporting insects, and for this purpose a good precaution is to have in the area a good supply of bees. It will be apparent from the foregoing that this invention is not in a particular cross-breeding of cotton strains but rather in a process of general application appropriate for the production of hybrid cottonseed from many different crosses. This invention provides the industry with a means of producing commercial quantities of a wide variety of hybrid cottonseed. It may be expected that some crosses will possess superior qualities from the viewpoint of fiber quality or quantity and others from the viewpoint of the quality or quantity of the oil obtainable and some crosses will undoubtedly produce inferior hybrids.

We claim:

1. The process of producing hybrid cotton seed which comprises treating one variety of cotton plant prior to the opening of the first flower buds thereof with a chlorinated compound which in water-solution forms the anion of a chlorinated aliphatic carboxylic acid containing from 2 to 4 carbon atoms per molecule and at least two chlorine atoms, said compound being applied at a rate and at a concentration in a diluent medium below the rate and concentration which cause serious injury to the plant under the conditions existing at the time of application, continuing the growth of the thus treated plants, developing male-sterile flowers thereon, causing the flowers of said treated plant to be fertilized by pollen from a different variety of cotton plant, maturing the flowers and seeds therefrom, and separately collecting the seed of the treated plants when the seed has matured.

2. The process of producing hybrid cotton seed which comprises planting at least two varieties of cotton in close proximity to each other but sufficiently segregated to permit application of a chemical to one variety without substantial contact of the chemical with another variety, applying to one of the said varieties prior to the opening of flower buds thereof a chlorinated compound which in water-solution forms the anion of a chlorinated aliphatic carboxylic acid containing from 2 to 4 carbon atoms and at least two chlorine atoms per molecule, said compound being applied at a rate and at a concentration in a diluent medium below the rate and concentration which cause serious injury to the plant under the conditions existing at the time of application, continuing the growth of the plants, developing male-sterile flowers on the treated plants, maturing the flowers and seeds thereon, and separately collecting the seed of the treated plants when the seed has matured.

3. The process of producing hybrid cotton seed which comprises planting at least two varieties of cotton in close proximity but sufficiently segregated to permit application of a chemical to one variety without substantial contact of the chemical with the other variety, applying to one of the said varieties before opening of flower buds thereof an aqueous solution of a chlorinated compound which forms in water the anion of a chlorinated aliphatic carboxylic acid containing from 2 to 4 carbon atoms and from 2 to 3 chlorine atoms per molecule said solution containing from 0.1% to 5% of said compound and being applied at a rate below that which causes serious injury to the plant under the conditions existing at the time of application, continuing growth of the two varieties of plants with development of flowers and seeds thereon, and separately collecting the seed of the treated plants when the seed has matured.

4. The process of producing hybrid cotton seed which comprises planting at least two varieties of cotton in close proximity to each other but sufficiently segregated to permit application of a chemical to one variety without substantial contact of the chemical with the other variety, applying to one of the said varieties before opening of flower buds thereof an aqueous solution of a compound which forms in water the anion $CH_2ClC(CH_3)ClCOO^-$, said solution containing from 0.1% to 5% of the said compound and being applied at a rate below that which causes serious injury to the plant under the conditions existing at the time of application, continuing growth of the two varieties of plants with development of flowers thereon, maturing flowers and seeds thereon, and separately collecting the seed of the treated plants when the seed has matured.

5. The process of producing hybrid cotton seed which comprises planting at least two varieties of cotton in close proximity to each other but sufficiently segregated to permit application of a chemical to one variety without substantial contact of the chemical with the other variety, applying to one of the said varieties before opening of flower buds thereof an aqueous solution of a compound which forms in water the anion $CH_2ClCCl_2COO^-$, said solution containing from 0.1% to 5% of said compound and being applied at a rate below that which causes serious injury to the plant under the conditions existing at the time of application, continuing growth of the two varieties of plants with development of flowers thereon, maturing flowers and seeds thereon, and separately collecting the seed of the treated plants when the seed has matured.

6. The process of producing hybrid cotton seed which comprises planting at least two varieties of cotton in close proximity to each other but sufficiently segregated to permit application of a chemical to one variety without substantial contact of the chemical with the other variety, applying to one of the said varieties before opening of flower buds thereof an aqueous solution of a compound which forms in water the anion $CH_3CCl_2COO^-$, said solution containing from 0.1% to 5% of said compound and being applied at a rate below that which causes serious injury to the plant under the conditions existing at the time of application, continuing growth of the two varieties of plants with development of flowers thereon, maturing flowers and seeds thereon, and separately collecting the seed of the treated plants when the seed has matured.

7. The process of producing hybrid cotton seed which comprises planting at least two varieties of cotton in close proximity to each other but sufficiently segregated to permit application of a chemical to one variety without substantial contact of the chemical with the other variety, applying to one of the said varieties before opening of flower buds thereof an aqueous solution of a compound which forms in water the anion $Cl_3CCOO^-$, said solution containing from 0.1% to 5% of said compound and being applied at a rate below that which causes serious injury to the plant under the conditions existing at the time of application, continuing growth of the two varieties of plants with development of flowers thereon, maturing flowers and seeds thereon, and separately collecting the seed of the treated plants when the seed has matured.

8. The process of producing hybrid cotton seed which comprises planting at least two varieties of cotton in close proximity to each other but sufficiently segregated to permit application of a chemical to one variety without substantial contact of the chemical with the other variety, applying to one of the said varieties before opening of flower buds thereof an aqueous solution of a compound which forms in water the anion $$CH_3CHClCCl_2COO^-$$

said solution containing from 0.1% to 5% of said compound and being applied at a rate below that which causes serious injury to the plant under the conditions existing at the time of application, continuing growth of the two varieties of plants with development of flowers thereon, maturing flowers and seeds thereon, and separately collecting the seed of the treated plants when the seed has matured.

9. The process of producing hybrid cotton seed which comprises planting at least two varieties of cotton in close proximity to each other but sufficiently segregated to permit application of a chemical to one variety without substantial contact of the chemical with the other variety, applying to one of said varieties before opening of flower buds thereof an aqueous solution of the sodium salt of 2,3-dichloroisobutyric acid, said solution containing from 0.1% to 5% of said salt and being applied at a rate below that which causes serious injury to the plant under the conditions existing at the time of application, continuing growth of the two varieties of plants of flowers thereon, maturing flowers and seeds thereon, and separately collecting the seed of the treated plants when the seed has matured.

10. The process of producing hybrid cottonseed, which comprises planting at least two varieties of cotton in close proximity to each other, but sufficiently segregated to permit application of a chemical to one variety without substantial contact of the chemical with another variety, applying to but one of said varieties before the opening of flower buds thereon a chlorinated compound which in water-solution forms the anion of a chlorinated aliphatic carboxylic acid containing 2 to 4 carbon atoms and at least two carbon atoms per molecule, said chlorinated compound being applied to the said variety in water at a concentration from 0.1% to 5% and at a rate between 1 and 16 pounds per acre, said concentration and said rate being below the concentrations and rates which cause serious injury to the treated plants under conditions existing at the time of application, allowing the plants to form flowers, fertilizing flowers of said treated plants with pollen from an untreated variety of cotton plant, allowing seed to mature on treated plants, and separately collecting the seed therefrom.

11. A process according to claim 10 wherein the said chlorinated compound is a water-soluble salt of 2,3-dichloroisobutyric acid.

12. A process according to claim 11 wherein the water-soluble salt is the sodium salt.

References Cited in the file of this patent

UNITED STATES PATENTS

| | | |
|---|---|---|
| 2,393,086 | Bousquet | Jan. 15, 1946 |
| 2,618,545 | Newcomer | Nov. 18, 1952 |

FOREIGN PATENTS

| | | |
|---|---|---|
| 347,744 | Italy | Apr. 20, 1937 |